Figure 2:
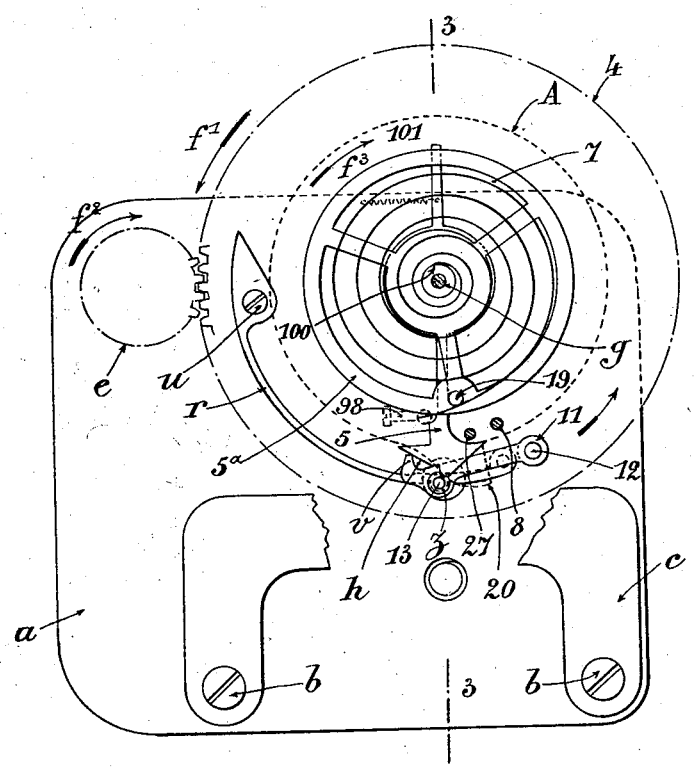

Feb. 22, 1927.

A. SEGUIN

SPEEDOMETER

Filed May 16, 1924     2 Sheets-Sheet 1

Augustin Seguin

By (signature)

His Attorney

Patented Feb. 22, 1927.

1,618,310

UNITED STATES PATENT OFFICE.

AUGUSTIN SEGUIN, OF PARIS, FRANCE.

SPEEDOMETER.

Application filed May 16, 1924, Serial No. 713,808, and in France June 4, 1923.

The present invention relates to speed-indicating apparatus of the type described in my prior Patent No. 1,499,881, filed May 31, 1921.

In the said apparatus, the striker constituting the element of comparison is mounted loose on the shaft of the balance wheel which serves to actuate the said striker during its expansion movement, the striker being actuated through the medium of a stud secured to the said balance wheel and with which the said striker comes into contact.

According to the present invention, an elastic connection is provided between the striker and the balance wheel, whereby the motion of the latter with respect to the striker when the balance wheel—during each revolution—is released from the driving wheel at the end of each forward stroke, is impeded, the said elastic connection thus providing for the damping of the forward stroke of the balance wheel, whilst the striker is arrested by a stop-piece.

The appended drawings show by way of example an embodiment of the said invention.

Fig. 1 is a plan view of the apparatus the striker being represented in an instantaneous position during the expansion movement of the balance wheel. Fig. 2 is a similar view showing the instantaneous position of the striker somewhat before it is released from the stud 13; and Fig. 3 is a cross section on line 3—3 of Fig. 2.

As stated in my above-mentioned specification, the speedometer according to the present invention comprises a frame consisting of the plate $a$, the two cross-pieces $b$, and the plate $c$, and containing the various parts of the apparatus. Upon the plate $a$ is mounted the screw $d$, Fig. 3, upon which is disposed the gear wheel 4 which is actuated at a speed proportional to the speed to be measured, by means of the pinion $e$. A shaft $g$ is journalled at one end in the wheel 4 and at the other end in the plate $c$; upon the said shaft is mounted a balance wheel 6 provided with a spiral spring 7. The spiral spring 7 is secured at one end to the plate $c$ by means of a screw 98 while the other end is folded laterally and engages a saw cut 100 in the sleeve $g^1$. Upon the outer face of the plate $c$ is mounted the indicating pointer 9 whereof the part situated at the centre of the apparatus comprises an extension 10 to which is secured an arm 8 at right angles to the plane of the pointer.

The said balance wheel is mounted by friction upon its shaft. A thin convex washer $q$, Figs. 2 and 3, secured to a shoulder on the sleeve $g^1$, and acting by friction upon the balance wheel, prevents the latter from turning during the normal operation. Upon the shaft $g$ of the balance wheel is mounted a disc $5^a$, Figs. 2 and 3, which is secured to sleeve $g^1$ by means of set screws 99; upon the latter is also frictionally mounted a striker 5, Figs. 2 and 3, adapted to be driven by the stud 19 of the disc $5^a$ during the expansion movement of the balance wheel; the stud 19 engaging a side of the striker 5 serves to drive the said striker in the contrary direction to the arrow $f^1$, Fig. 1.

To the wheel 4 is pivoted at 12 a small arm 11 whose outer end (with reference to its pivoting axle 12) has the shape of a hook $v$ (Fig. 2); said arm is controlled by the spring $r$ which is secured at $u$ to the wheel 4; the said hook co-operates with the arm 8 in order to impel the pointer 9 in the direction of the arrow, Fig. 1. The lower face of the arm 11 carries the stud $z$, Figs. 1 and 2, co-operating with a circular cam A provided with a boss 20. The arm 11 is further provided upon its upper face with a stud 13 co-operating with the striker 5 which comes into contact with the stud 19 of the disc $5^a$ secured to the balance wheel, so that the latter will be driven in the direction of the arrow $f^1$. But according to this invention, the striker 5 and the disc $5^a$ are connected together for instance by a spring 101, Fig. 2, whereof one end is attached to the end of the striker and the other to the rim of the disc $5^a$.

In the same manner as for the apparatus described in my above said patent application, when the pinion $e$ rotates in the direction of the arrow $f^2$, the driving wheel 4 turns in the direction of the arrow $f^1$ and the striker 5, driven by the stud 13 of the arm 11, will wind up the balance wheel 6 in the direction of arrow $f^2$ through the medium of the stud 19 secured to the disc $5^a$. When the stud $z$ comes into contact with the boss 20 of the cam A, the lever 11 will swing outwardly, and the stud 13 will be disengaged from the striker 5, instantaneous position shown in Fig. 2.

thereby releasing the balance wheel. The striker is arrested at this time by the stop piece 27 screwed into the plate C in order to prevent it from being drawn too far and thus taken up by the stud 13, which would now have returned to its inoperative position, before the balance wheel returns backward. After a greater or less forward motion, according to the speed to be measured, the balance wheel then turns backward—contrary to the arrow $f^1$—and again comes into contact with the striker 5, driving the latter through the medium of the stud 19 (instantaneous position shown in Fig. 1.)

The arm 8 of the pointer may be actuated either by the hook $v$ of the lever 11 according to the arrow $f^1$, or by the striker in the direction of the arrow $f^3$. But when the striker, which is now rotating backward by reason of the expansion movement of the balance wheel, comes into contact with the stud 13, the latter will mount upon the ramp $h$ of the striker, and the hook $v$ will be disengaged from the arm 8 which thus remains stationary whilst the arm 13 again drives the striker and balance wheel forward. It is in fact this position of the arm 8 and therefore of the pointer 9 which indicates the speed sought for.

If the speed to be measured increases the disengagement of arm 8 from hook $v$, due to the contact of stud 13 with the ramp $h$, will take place somewhat farther in the direction of arrow $f^1$ since arm 11, together with hook $v$, will have turned through a greater angle than before. Arm 8 and, therefore, pointer 9 will thus be turned through a certain angle and the new position of pointer 9 will correspond to that greater speed.

If the speed to be measured decreases, the striker 5 will meet the stud 13 at a point situated somewhat nearer the boss 20 and, consequently, will meet the arm 8 before meeting the stud 13. Striker 5 will thus drive the arm 8, together with the pointer 9 in the backward direction (arrow $f^3$) until the engagement takes place with stud 13. At this instant, the striker 5 is driven in the forward direction by the stud 13, but at the same time, the hook $v$ is shifted radially by the engagement of stud 13 and ramp $h$, thus releasing the arm 8 exactly at the point where striker 5 met with stud 13. The new position of pointer 9, somewhat to the rear from the preceding, corresponds to a smaller speed.

In the apparatus according to the invention, the elastic connection between the striker 5 and the disc $5^a$ provides for the regularity of the period of forward motion of the balance wheel, after the said striker has been arrested by the stop-piece 27; due to the action of the spring 101, the balance wheel is subjected to a stronger torque during said period, so that any errors which may occur, for instance irregularities in the spiral spring of the balance wheel or variations in the friction of the balance wheel upon the washer $q$, will have a reduced effect upon this motion.

Further the elastic connection between the striker 5 and the disc $5^a$ prevents any back motion of the striker before the stud 19—which has been drawn along with the balance wheel and the disc $5^a$ in their forward motion—has moved backward into contact with the striker; for in fact if the spring 101 were not employed, since the striker is in contact with the balance wheel, it would begin to be driven backward along with the balance wheel as soon as the latter rotates backward, and before the stud 19 reaches back the striker. An angular displacement which might prove a source of error, would thus be produced between the balance wheel and the striker. On the contrary, the spring 101 will in all cases urge the striker against the said stud.

It is evident on the one hand that in the case of apparatus in which the balance wheel 6 is keyed to its shaft instead of being mounted thereon by friction, the elastic connection will be made directly between the striker and the balance wheel, and on the other hand that any other suitable connecting means than those described may be employed without departing from the principle of the invention.

Having now described my invention, what I claim as new and desire to secure by Letters Patent is:

1. In a speed measuring apparatus of the kind referred to the combination of a balance wheel, a striker adapted to alternately drive said balance wheel in a forward direction and be driven by the same in a rearward direction and elastic means for connecting said striker to said balance wheel and whereby the movements of the balance wheel relative to the striker are impeded.

2. An apparatus for the measurement of speed comprising in combination: a driving member operable at a speed proportional to the speed to be measured, an antagonistic movable member frictionally mounted on its axle, a striker loosely mounted on said axle, means whereby said striker may drive said antagonistic member and reciprocally, means for rotating said antagonistic member and said striker in the opposite direction to that of the speed to be measured, indicating means adapted to be operated by said driving member and by said striker respectively, means for rotating said striker and said antagonistic member in the direction of the speed to be measured, means for disengaging said striker from the driving member, means adapted to couple said driving member with the indicating means, means including said striker for disengaging the indicating means from the driving member and a yielding connection between said striker and said antagonistic member and whereby the movements of the latter relative to the striker are impeded.

3. An apparatus for the measurement of speed comprising in combination: a driving member operable at a speed proportional to the speed to be measured, an antagonistic movable member frictionally mounted on its axle, a striker loosely mounted on said axle, means whereby said striker may drive said antagonistic member and reciprocally, means for rotating said antagonistic member and said striker in the opposite direction to that of the speed to be measured, indicating means adapted to be operated by said driving member and by said striker respectively, means for rotating said striker and said antagonistic member in the direction of the speed to be measured, means for disengaging said striker from the driving member, means adapted to couple said driving member with the indicating means, means including said striker for disengaging the indicating means from the driving member and a spring the end parts whereof are respectively connected to said striker and to said antagonistic member, whereby the movements of the latter relatively to the striker are impeded.

4. An apparatus for the measurement of speed comprising in combination: a driving member operable at a speed proportional to the speed to be measured an antagonistic movable member frictionally mounted on its axle, a striker loosely mounted on said axle, means whereby said striker may drive said antagonistic member and reciprocally, means for rotating said antagonistic member and said striker in the opposite direction to that of the speed to be measured, indicating means adapted to be operated by said driving member and by said striker respectively, means for rotating said striker and said antagonistic member in the direction of the speed to be measured, means for disengaging said striker from the driving member, means adapted to couple said driving member with the indicating means, means including said striker for disengaging the indicating means from the driving member and a coil spring having one end attached to said striker and the other end connected to said antagonistic member, whereby the movements of the latter relatively to the striker are impeded.

In testimony whereof I have signed my name to this specification.

AUGUSTIN SEGUIN.